US006859745B2

(12) United States Patent
Carr et al.

(10) Patent No.: US 6,859,745 B2
(45) Date of Patent: Feb. 22, 2005

(54) INTERACTIVE INFORMATION PACKAGE

(75) Inventors: Timothy W. Carr, Carmel, IN (US); Siegfried Landskrone, Kirchheimbolanden (DE); Lawrence M. Smeyak, Lafayette, IN (US); Mark Powell, Crawfordsville, IN (US); Sharon L. Gatlin-Chambers, Fishers, IN (US); John Ziegler, Carmel, IN (US)

(73) Assignee: Alcoa Closure Systems International, Crawfordsville, IN (US)

( * ) Notice: Subject to any disclaimer, the term of this patent is extended or adjusted under 35 U.S.C. 154(b) by 116 days.

(21) Appl. No.: 10/124,440

(22) Filed: Apr. 17, 2002

(65) Prior Publication Data

US 2002/0183883 A1 Dec. 5, 2002

Related U.S. Application Data

(60) Provisional application No. 60/291,916, filed on May 18, 2001.

(51) Int. Cl.$^7$ .......................... G01N 37/00; G06F 19/00
(52) U.S. Cl. ....................................................... 702/81
(58) Field of Search ..................... 702/81, 122, 188; 340/539.17, 870.16, 572.1, 240.1; 356/240.1; 700/115; 24/601

(56) References Cited

U.S. PATENT DOCUMENTS

| 5,566,441 | A | | 10/1996 | Marsh et al. |
| 5,635,917 | A | | 6/1997 | Todman |
| 5,887,176 | A | * | 3/1999 | Griffith et al. ............... 713/320 |
| 5,971,282 | A | | 10/1999 | Rollender et al. |
| 6,212,741 | B1 | | 4/2001 | Cahill |
| 6,226,619 | B1 | | 5/2001 | Halperin et al. |
| 6,294,999 | B1 | * | 9/2001 | Yarin et al. ............... 340/573.1 |
| RE37,574 | E | * | 3/2002 | Rawlins ......................... 702/2 |
| 6,483,434 | B1 | * | 11/2002 | Umiker ................... 340/572.1 |
| 2001/0049629 | A1 | * | 12/2001 | Freeman ....................... 705/23 |
| 2002/0044096 | A1 | * | 4/2002 | Chung .......................... 705/23 |
| 2002/0067265 | A1 | * | 6/2002 | Rudolph .................. 340/572.1 |
| 2002/0073646 | A1 | * | 6/2002 | Von Gutfeld et al. ........... 53/54 |

FOREIGN PATENT DOCUMENTS

| EP | 0 619 243 | 10/1994 |
| EP | 0991013 | 4/2000 |
| WO | WO 94/27117 | 11/1994 |
| WO | WO 01/17893 A2 | 3/2001 |
| WO | PCT/US02/15508 | 3/2002 |

* cited by examiner

Primary Examiner—John Barlow
Assistant Examiner—Demetrius R. Pretlow
(74) Attorney, Agent, or Firm—Stephen D. Geimer

(57) ABSTRACT

A product package embodying the principles of the present invention includes an integrated circuit device which is configured for radio frequency interfacing with associated equipment. The package is configured such that the integrated circuit device is disposed within the package, thus assuring that the device remains associated with the package's contents. Notably, this arrangement facilitates use of the device for applications apart from product tracking and inventory control, including product promotions, storage, and dissemination of product information, and quality assurance including tamper-indication. A packaging machine for writing information on, and or reading information from, the integrated circuit device is also disclosed.

30 Claims, 1 Drawing Sheet

INTERACTIVE INFORMATION PACKAGE

TECHNICAL FIELD

The present invention relates generally to packaging including a radio frequency integrated circuit for exchange of information with associated devices, and more particularly to an interactive information package comprising a closure and container, with the package including a radio frequency integrated circuit, or alternately, a radio frequency integrated circuit with a coupled or integrated micro-sensor array, disposed therein for varying applications including: product promotions; storage and dissemination of product information including product processing; and quality assurance including tamper-indication by monitoring the conditions within the product package.

A packaging machine in the form of an interactive capping machine is also disclosed, with the machine capable of writing information onto, and capturing information from, the electronics of the present package.

BACKGROUND OF THE INVENTION

The development of integrated circuitry has permitted use of such devices in a wide range of applications. Identification cards, credit cards, and like articles may include such devices for "radio frequency identification" (RFID) with so-called "smart cards" permitting access to information carried by the circuitry by radio frequency interface. Typically, the integrated circuit is provided with an antenna which functions as an induction coil for radio frequency interfacing. By presentation of the card to a suitable radio frequency scanner, information stored in the integrated circuit can be efficiently accessed without physical contact, with the radio frequency energy providing energization of the circuit. Such devices may be configured for "read only" interfacing, and thus provide information to the associated scanner, and may be further configured to receive information input by a radio frequency source, thus permitting information on the integrated circuit to be rewritten as may be required, such as for deducting a payment from a stored monetary value for payment of a fare or toll. U.S. Pat. Nos. 5,731,576, 5,901,303, and 6,199,128, all hereby incorporated by reference, disclose exemplary radio frequency identification systems.

As the cost for such integrated circuitry has decreased, the use of such RFID devices for product packaging is gaining acceptance. Use of such devices on product packaging permits the devices to provide functions in the nature of a bar code, precluding the need for optical scanning, while permitting product tracking such as for inventory control purposes. Scanning devices can be provided to monitor removal of products from a store shelf, and/or provide a "check-out" function for a shopper, precluding the need to individually optically scan a shopper's purchases.

Heretofore, use of such RFID devices for product packaging have principally been directed toward use of such devices on the exterior of a package, such as on a product's label. Of course, should the product itself become separated from its label or other packaging, the tracking function provided by the RFID device is essentially lost. Moreover, this typical placement of such devices ordinarily cannot provide any function associated with the product itself, such as quality assurance, including tamper-indication.

The present invention is directed to an improved product package including an integrated circuit which is configured for disposition within the package. By this arrangement, the integrated circuit device can provide a broad range of functions, greatly enhancing the value of the packaging arrangement for both the producer and the consumer.

SUMMARY OF THE INVENTION

A product package embodying the principles of the present invention includes an integrated circuit device which is configured for radio frequency interfacing with associated equipment. The package is configured such that the integrated circuit device is disposed within the package, thus assuring that the device remains associated with the package's contents. Notably, this arrangement facilitates use of the device for applications apart from product tracking and inventory control, including product promotions, storage, and dissemination of product information, and quality assurance including tamper-indication. A packaging machine for writing information on, and or reading information from, the integrated circuit device is also disclosed.

In accordance with the present invention, an interactive information package includes a plastic closure, and a container on which the closure is secured for closing the contents of the container. The package includes a radio frequency integrated circuit and antenna operatively connected thereto for disposition within the package when the closure is secured to the container. The integrated circuit is remotely programmable from the exterior of the package via radio frequency transmission. It is also contemplated that the closure may contain an array of micro-sensors preferably integral with the integrated circuit to assess product quality and enable tamper-evidence.

By the arrangement of the present invention, a method of conducting a promotion can be practiced by the provision of such a package, including the radio frequency integrated circuit disposed therein. By inputting radio frequency information to the integrated circuit, promotional information can be "written" onto the circuitry. This permits the promotional information to later be retrieved from the integrated circuit by a radio frequency reading device. The antenna of the package serves two purposes, with power provided to the integrated circuit through the antenna coupling eliminating the need for an internal power supply. Simultaneously, promotional information can be written onto and/or retrieved from the integrated circuit through the antenna coupling.

It is contemplated that the only information actually "written" onto the integrated circuit device could be a "serial number" or like product code which would uniquely identify an individual package, rather than simply the product itself. This approach would require that the bulk of the promotional information be written to an Internet or other electronic database rather than be stored on each individual integrated circuit. As will be appreciated, a desirable aspect of the present system concerns the capability of writing promotional information, or promotional codes, on the integrated circuit during the capping process, or as the capped product enters various retail outlets. This arrangement desirably makes it possible to eliminate the long lead time typically required for planning promotions, and the required pre-build, and potential scrapping of promotional inventories.

A further aspect of the present invention contemplates a method of monitoring the contents of a package for quality assurance, including tamper-indication. A package is provided comprising a container and closure, with the package including a radio frequency integrated circuit and antenna disposed within the package. The package is provided with at least one sensing device operatively connected to the integrated circuit, and preferably integral with the integrated circuit, with the sensor configured form sending conditions such a temperature and/or pressure, within the package. To fulfill the function of tamper-evidence indication, it is contemplated that a compact power supply be operatively connected to the integrated circuit. For some applications, an array of micro-sensors can be provided, preferably being integrated with the radio frequency integrated circuit When the package, including the container and closure with the installed electronic components, is placed in the proximity of a radio frequency writing device, it is possible to write information onto the integrated circuit of the package, thereby turning on the power supply, and activating the sensing device, such as micro-pressure-sensor. If an array of micro-sensors is provided, it is possible for the array to write information onto the integrated circuit (the radio frequency writing device can supply power to the integrated circuit, allowing the transfer of information from the integral sensor array to the integrated circuit). It is also possible to later retrieve the sensor information (such as the pressure "history") from the integrated circuit through use of a radio frequency reading device. As for use with product promotions, use of the present package in this manner is accomplished by radio frequency coupling of the package's integrated circuit through the antenna operatively connected to the circuit.

Through the use of such a sensing device coupled to the integrated circuit, various quality assurance functions can be provided. A significant and measurable loss of pressure, or vacuum, in a sealed package provides a clear indication that the package has been opened and/or tampered with. Since the integrated circuitry can be configured to continuously monitor the pressure state of the package during its useful life, it is possible to record and retrieve the magnitude and frequency of any such pressure or vacuum loss. It is contemplated that the micro-sensor array be comprised of (but not limited to) pressure sensors, temperature sensors, chemical sensors, and microbiological sensors, or a predetermined subset of these sensors selected for specific product applications.

As will be appreciated, this aspect of the present invention provides significant advantages over current tamper-evidence systems. Existing technology for pressurized or vacuum-packaged containers typically involves packaging that breaks, permanently deforms, changes color, or makes audible sounds when the package is opened by the consumer. Such arrangements include tamper bands on plastic closures which break away from the closure when the package is opened. Metal lug caps used on vacuum pack containers typically create an audible "pop" sound from the elastically deformed top of the metal closure when the vacuum within the package is released during opening. It is contemplated that initially, consumers will benefit from this quality assurance arrangement at the point of product purchase, as the product is read by a scanner or like reading device located at the check-out of the retail establishment. It is expected that as use of such arrangements become more widespread, consumers will have suitable appliances and reading devices for home use that will enable the reading of tamper-evidence and other quality assurance information directly from the package by the consumer.

Inclusion of a suitable micro-audio device permits the present invention to provide a "real-time" message to the consumer at the time of product opening, thus obviating the need for a radio frequency reading device or like scanner. It is contemplated that such an arrangement could provide an audible message that the product is "approved for consumption", or "okay to drink" when the closure is removed from the container, provided that the circuitry of the package has monitored an acceptable pressure/time history record.

A further aspect of the present invention contemplates a method of providing enhanced inventory control and dissemination of product information. Information regarding the time and date of packaging, sometimes referred to as the "born on date" can be readily written on the integrated circuit of the present package. Other processing information can also be provided for subsequent access as may be required. Product information, beyond that which can be easily printed on a package label, may be written on the integrated circuit of the present package, including nutritional information, product recipes, and the like. Once again, it is alternately contemplated that only a unique identification code be actually written on the integrated circuit, with the bulk of other relevant information being written on an Internet or other electronic database which can be later accessed through the unique product identification code.

As will be appreciated, the introduction of plastic closures and like packaging containing radio frequency identification technology, including coupling with micro-sensor arrays, will permit capture of significant information on the conditions under which individual packages are capped, closed, or otherwise sealed. For example, application torque, application angle, temperature at capping, line speed at capping, verification of the integrity of capping, verification of the integrity of sealing, etc., can be monitored. As noted, there is also a need to provide and capture the product "born on" date, write a unique product identification code on each individual package, and write promotional information for each individual package, as well as test the functionality of the radio frequency identification technology itself to ensure that it is operational on each individual capped and sealed package.

To this end, the present invention contemplates that rather than adapting a standard radio frequency identification reading/write device for application in high speed capping lines or like packaging operations, a "smart capping machine" is the ideal equipment platform for writing and capturing the extensive information that will be available. The application of the closure, and simultaneous sealing of the package, actually defines the "birth" of each individual package. Prior to closure application, the package is essentially an unsealed container, not a package ready for processing and the distribution channel. A capping machine embodying the principles of the present invention is equipped with sensors to provide capping condition information, and the necessary radio frequency interface electronics to transfer this information to each individual package as it is capped.

Other features and advantages of the present invention will become readily apparent from the following detailed description and accompanying drawings.

DETAILED DESCRIPTION

Figure 1:
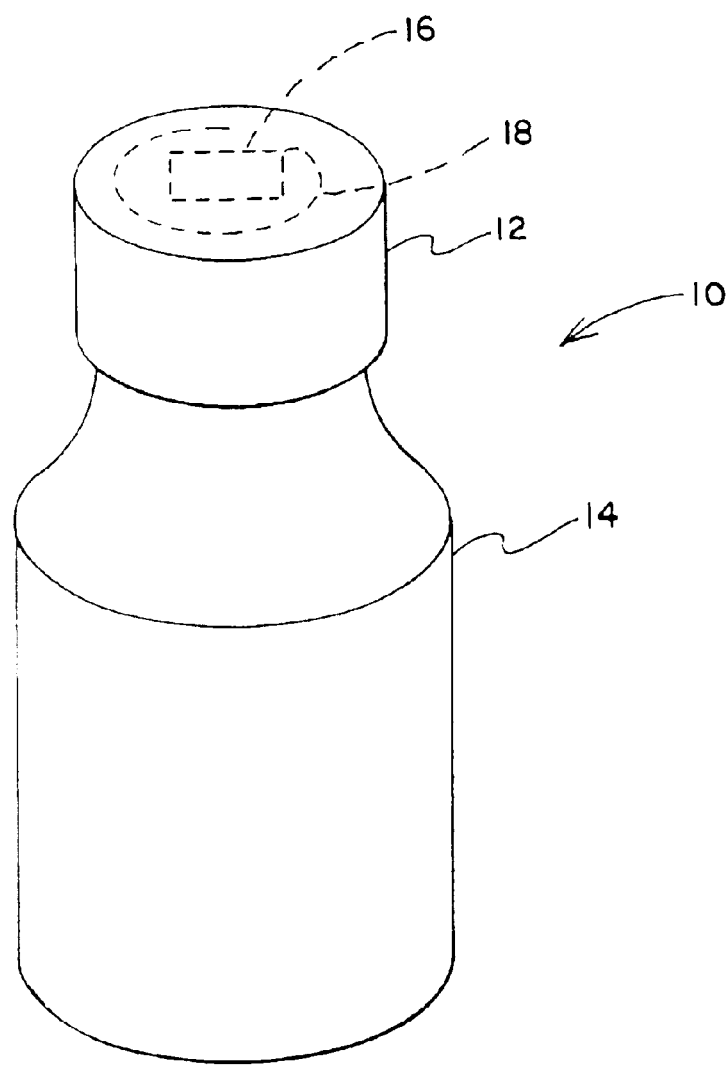
FIG. 1 is a diagrammatic view of an interactive information package embodying the principles of the present invention, including a plastic closure and associated container.

While the present invention is susceptible of embodiment in various forms, there is shown in the drawings, and will hereinafter be described, a presently preferred embodiment, with the understanding that the present disclosure is to be considered as exemplifications of the invention, and is not intended to limit the invention to the specific embodiment disclosed herein.

The present invention is directed to an interactive information package comprising a plastic closure and container, wherein a radio frequency integrated circuit and associated antenna are disposed within the package, preferably by disposition on or at the interior surface of the package closure. The arrangement of the present package facilitates its use for a variety of applications, including a method of conducting a product promotion, a method of storing and disseminating product information including product processing information, and a method of providing product quality assurance, including tamper-evidence. The present invention also permits efficient inventory control, by permitting product purchases to be efficiently tracked without resorting to optical scanning of bar codes or the like.

As illustrated in FIG. 1, the package 10 embodying the principles of the present invention comprises plastic closure 12 and an associated container 14 to which the closure can be secured, such as by cooperating, interengaged thread formations. The plastic closure 12 can be formed by injection molding or compression molding, with U.S. Pat. No. 4,497,765, hereby incorporated by reference, disclosing a method and apparatus for efficiently compression molding closures of this type.

Figure 2:
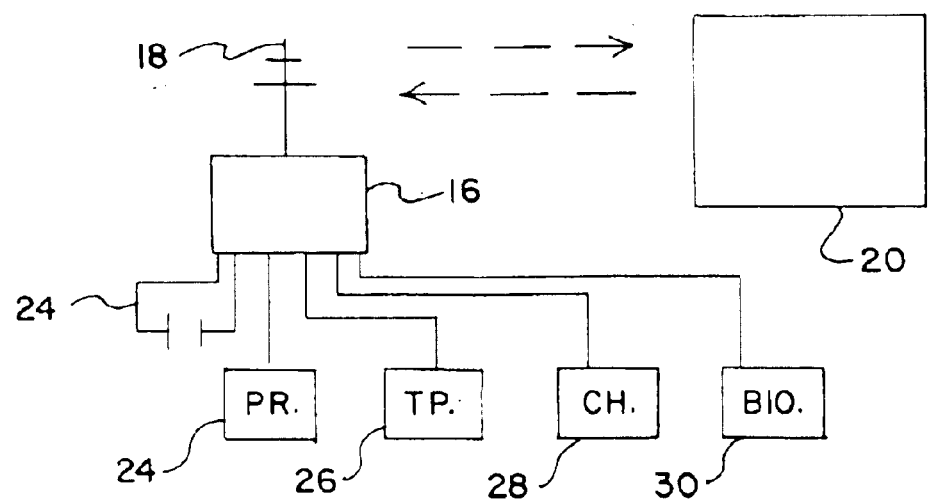
FIG. 2 is a diagrammatic view of a radio frequency integrated circuit system for providing promotional and quality assurance functions in accordance with the present invention.

In accordance with the present invention, the package 10 includes a radio frequency integrated circuit 16 disposed within package 10, preferably by disposition on or at the interior surface of the closure 12. The arrangement includes an antenna 18 operatively connected to the integrated circuit 16 with the antenna cooperating with the integrated circuit to permit the integrated circuit to be externally powered without physical connection of a power supply thereto. The antenna 18 provides the desired radio frequency interface with an associated radio frequency input/output device 20 (FIG. 2) which can be configured to provide remote input to and/or reading and retrieval of electronic information carried by the integrated circuit 16.

It is contemplated that integrated circuit 16 and antenna 18 (and any associated components) be secured within closure 12 such as by use of a suitable adhesive. For some applications, the circuit 16 and antenna 18 can be positioned and secured within the closure during molding thereof. Heat bonding of the circuit and antenna, such as by ultrasonic welding, can also be used by disposition of the circuit and antenna on a suitable heat-bondable substrate. Mechanical attachment methods are also possible for securing the circuit 16 and antenna 18 within the closure 12.

In the embodiment illustrated in FIG. 1, external powering of the integrated circuit 16 precludes the need for an internal power supply operatively connected to the integrated circuit for providing electrical power thereto. However, for some configurations of the present invention (such as providing tamper-evidence indication or capturing continuous historical data on package parameters such as pressure and/or temperature), it can be desirable to provide a compact power supply 22, such as diagrammatically illustrated in FIG. 2, operatively connected to the integrated circuit 16.

The electronics of the package can be configured to include one or more of different compact-sized (i.e., micro) sensing devices. Such sensing devices may include, by way of example, a pressure sensor 24, a temperature sensor 26, a chemical sensor 28 for sensing the presence of chemicals such as oxygen, and/or a biological sensor 30 for sensing the presence of microorganisms within the package 10. As will be further described, configuration of the present package with one or more of the internal sensing devices greatly enhances versatile use of the present package for quality assurance functions, including tamper-evidence, brand protection, and anti-counterfeiting. An array of sensors can be provided for certain applications, with the array preferably integrated with radio frequency integrated circuit 16. The provision of one or more sensors permits direct assessment of the quality state of the packaged goods.

Use of the package of the present invention in connection with a product promotion will now be described. For this application, it is contemplated that the integrated circuit 16 of the package 10 be externally powered via antenna 18, and thus no internal power supply such as 22 is typically required. The method of conducting a promotion in accordance with the present invention includes providing a package 10 as disclosed herein, including providing a radio frequency integrated circuit for disposition within the package. The integrated circuit 16 and antenna 18 are preferably positioned inside of the closure 12, with suitable indicia on the closure or other portion of the package 10 advising consumers of the promotion being conducted.

When the package 10, with closure 12 secured to container 14, is placed in the proximity of a radio frequency "writing" device such as 20, the integrated circuit 16 can be remotely programmed from the exterior of the package via radio frequency transmission. By this arrangement, it is possible to write promotional information onto the integrated circuit, with the information later being retrieved by radio frequency transmission with the integrated circuit 16 through use of a suitable reading device or scanner. As noted, the antenna 18 not only serves to provide power to the integrating circuit, thus obviating the need for an internal power supply, but also acts to couple the integrated circuit with the external input/output device 20 so that promotional information can be written onto and/or retrieved from the integrated circuit 16.

As will be appreciated, the specific information that can be "written" on the integrated circuit can be varied while keeping with the principles disclosed herein, but it is presently contemplated that the information would be in the nature of a "serial number", or other code having sufficient specificity to uniquely identify the individual package. This code can be written onto the integrated circuit 16 at the time of product packaging, such as filling of the container 14, through the use of a "smart" capping machine, or a stand-alone radio frequency writing device.

At the time the code is read by a suitable radio frequency reading device or scanner, the code can be used to access and interface with an Internet (or other) data base, at which the actual promotional game is stored. This aspect of the present invention desirably acts to limit the size and data storage requirements of the integrated circuit 16, since the major portion of the promotional information would be stored in the Internet, or other, data base. By limiting the size of the required integrated circuit 16, the cost for the integrated circuit 16 and its associated antenna 18, as installed in the promotional closure 12, can be desirably minimized. As will be recognized, by storing the actual promotional game on such a data base, the security for the game system is enhanced, in comparison to an arrangement in which the entire promotional system is stored on an individual integrated circuit.

A particularly desirable aspect of the present invention for product promotion concerns the capability to write promotional information, or a promotional code, onto the integrated circuit 16 during the packaging (capping) process, or as the product package enters various retail outlets. By this arrangement, it is possible to eliminate the typical long lead times required for planning promotions, and obviates the typically required "pre-build" and potential scrapping of product inventories. Since the product promotional information can be transferred to the package closure through suitable software, it is possible to begin the release of specific promotional closures and packages within a very short time of a major event taking place (i.e., New York Yankees win the World Series, etc.).

The capability of writing promotions or promotional code additionally provides heretofore unavailable flexibility for the product promotion format. It is possible to reprogram the promotion without removing product from the retail shelf through the use of a mobile read/write radio frequency device.

It is contemplated that consumers will initially benefit from this product promotion system at the point of purchase of the promotional product, as the product is read by a scanner (reading device) located at the check-out area of a retail establishment. It is envisioned that in the future, consumers will have "smart" appliances and/or radio frequency reading devices or scanners that will enable the reading of promotional information directly from the package within the consumer's residence.

The next aspect of the present invention that will be described is a method of monitoring the condition of contents within a package for quality assurance purposes. Use of the package 10 in this fashion contemplates the provision of one or more sensors operatively connected with the integrated circuit 16. The provision of an integral power supply 22 operatively connected with the integrating circuit permitting operation of the electronics with the package apart from a source of radio frequency energy acting through antenna 18 is only required if a continuous record of package quality conditions is required as is the case with tamper-evidence indication. A principal application of this aspect of the invention is tamper-evidence or tamper-indication. As discussed above, existing tamper-evident technology typically includes product packaging which becomes physically altered attendant to opening, such as by breakage or deformation of a closure pilfer band, color change, or other visually discernible physical change. As will be appreciated, such typical arrangements usually require special features on a container and/or closure to enable tamper-evidence during opening. These additional features often result in increased material usage, thus significantly increasing packaging costs. Since the tamper-evidence is often mechanical in nature, breakage can occur in shipping or capping, and can undesirably result in significant scrapping of packages that have not been tampered with (referred to as lost production). While highly effective, such arrangements can nevertheless be the subject of tampering.

Tamper-evidence for vacuum-packed containers has typically relied upon the elastically formed metal closure applied to such containers, which closures make an audible "pop" sound when vacuum is released from the package during opening. The closure itself may exhibit a visually discernible non-deformed appearance after release of the container vacuum.

Use of the present invention for tamper-evidence includes providing a container package, including a closure and container, as described hereinabove, including an integrated circuit 16 and one or more associated sensors. In one contemplated arrangement, a micro-pressure sensor 24 is operatively connected with the integrated circuit 16 with a suitable micro-power supply 22 provided within the closure 12 together with the integrated circuit and pressure sensor. When the package 10, with the installed electronics, is placed in the proximity of a suitable radio frequency writing device, it is possible to write information onto the integrated circuit 16, thus activating the power supply 22 and the pressure sensor 24. It is also possible to later retrieve pressure history information from the integrated circuit 16 through a radio frequency reading device or scanner. Antenna 18 acts to couple the integrated circuit 16 with the exterior input/output device via radio frequency, without physical contact of the package 10.

In the case of a container having pressurized contents, or a container in which a vacuum is created, a significant and measurable loss of pressure or vacuum provides a clear indication that the package has been opened and/or tampered with. Because the internal electronics in the package 10 will continuously monitor the pressure state of the interior of the package during the life of the package, it is possible to record and retrieve the magnitude and frequency of any such pressure or vacuum loss. Unlike current tamper-evident systems, which can only indicate if a package has been opened, the present invention can also provide an indication as to when the package was opened (measured from the time of initial capping), and how often the package has been opened (i.e., the complete pressure/time history of the package will be available for audit).

A predetermined loss of pressure or vacuum in a sealed package can often be directly correlated to the quality of the product. For example, carbonated beverages are deemed to be of poor quality when a 17% loss of carbonation is reached. The carbonation level in the package is directly dependent of the pressure in the package head space and the temperature of the product. By knowing the pressure and temperature at any point in time, the quality of the carbonated product, and its fitness for consumption, can be directly assessed. Similarly, the loss of vacuum in a vacuum-packed container is a direct indication of potential spoilage of contamination. In a similar manner, the presence of micro-organisms, pathogens, or chemicals can also be sensed to provide a direct indication that the food or beverage product is not fit for consumption.

It is contemplated that consumers will initially benefit from the present quality assurance system at the point of product purchase, as the product is read by a suitable radio frequency reading device or scanner located at the check-out area of a retail establishment. Again, it is contemplated that in the future, consumers will typically have suitable "smart" appliances or home radio frequency reading devices that will enable reading of product quality information directly from the package in the consumer's home.

It is within the purview of the present system that a suitable micro-audio device be installed in the closure 12 to give a "real-time" message to the consumer at the time of opening, thereby obviating the need for a radio frequency reading device or scanner. By such an arrangement, the package can be configured to provide an audible statement such as "approved for consumption", or "okay to drink" when the closure 12 is removed from the container 14, pending an acceptable pressure/time history record stored in the integrated circuit 16. The incorporation of a micro-audio device to eliminate the need for a "reading" device ordinarily requires the addition of a power source such as 22.

It is envisioned that significant cost savings to packaging suppliers, and ultimately to consumers, can be achieved through use of the present tamper-evident system. The present system desirably permits reduction in packaging material, resulting from the elimination of typical tamper-evident features currently required to activate mechanical tamper-evident arrangements.

It is further contemplated that the present invention can be configured for other types of quality assurance functions. By the provision of a temperature sensor 26 operatively connected with integrated circuit 16, it is possible to generate and capture a temperature time history for the contents of the package 10. This can be particularly desirable for creating a temperature profile of a product during its processing, such as during pasteurization or other heat treatment process. To assure the quality of many products, the products are subjected to elevated temperatures for predetermined time periods. By providing a system which permits monitoring of a product's temperature and creation of a temperature profile, it is possible to audit individual packages in real time to optimize the heat treatment process relative to product taste and consistency. Simultaneously, information is provided that can indicate and quickly provide an alarm attendant to processing equipment problems.

As will be recognized, many foods and beverages require pasteurization or post-packaging heat treatment to ensure that all microorganisms are destroyed before the package reaches the consumer. Since there is inherent variability associated with pasteurization and heat treatment process, the products must be over-processed to ensure that no individual packages receive insufficient pasteurization or heat-treatment. This over-processing results in degrading the taste and consistency of the food or beverage product, making them less appealing to the consumer.

Moreover, during the pasteurization or heat-treatment of food and beverage products, problems with processing equipment may not be detected in a timely fashion. This can result in the need to destroy significant inventories of packages, or even worse, can result in the need to recall packages from the distribution chain. The recall process can be very detrimental to the integrity of the product brand name, causing significant loss in future sales of market share.

The audit capability of the present invention will provide significant protection relative to product recall, and thus facilitate protection of brand names. If a product recall or the need to separate some packages from remaining product were to occur, the present invention provides a nondestructive and effective method to sort products, and thus minimize the financial impact of the recall process. Quality assurance is greatly facilitated, both attendant to product packaging, as well as throughout the product distribution system.

Quality assurance can be further facilitated by the present invention by the provision of a biological sensor 28 operatively connected with integrated circuit 16. By such an arrangement, the quality of products subject to degradation over time can be readily monitored. Similarly, the use of pressure sensor 24 permits monitoring of a carbonated product within the container 10, thus permitting a determination of whether a product has gone "flat" without resort to unsealing of the container. In these cases, a power supply is not required since the quality measurement can be taken at single points in time in the presence of a radio frequency reading device and a continuous history of quality data is not typically required.

A further aspect of the present invention concerns a system for providing enhanced inventory control and improved dissemination of product information. It is contemplated that this aspect of the invention can be practiced with the configuration of package 10 including integrated circuit 16 and antenna 18, with the integrated circuit externally powered by coupling through the antenna 18. This aspect of the invention contemplates that the integrated circuit 16 be provided with information regarding packaging of the contents, and/or information for consumers, such as recipes or the like.

In the production of packaged beverages and foods, it is important to track inventory and inventory distribution. Many beverages or foods rely on a "born on date", "sell before dates", or product expiration dates printed on the package at the time of packaging to ensure product freshness. While this affords the consumer some ability to determine if the food or beverage product is still fit for consumption at the time of use, this information does not reflect any direct assessment of the quality of the packaged food or beverage. Since there is an inherent distribution associated with product quality as a function of product age, dependence solely upon "born on dates" or product expiration dates results in a significant percentages of good product being rejected by consumption by the consumer.

It is also very important, and frequently required, to track product information dates, such as for purposes of a possible product recall. It also can be desirable to provide detailed information regarding use of a product beyond the typical printed instructions for use. By way of example, it can be beneficial to consumers to provide a list of recipes for a particular food product. It can also be desirable for the product packager to document the conditions under which the product was packaged (i.e., the amount of torque applied to close the package, the particular capping head used to close the package, the ambient temperature during packaging, the line speed under which the package was closed, etc.). Currently, this information is too cumbersome or impossible to capture in the standard pre-printed format typically employed in packaging labeling.

An interactive information package embodying the principles of the present invention greatly facilitates recording and dissemination of product information such as identified above. By disposition of integrated circuit 16 of the present package generally within the package structure, users are assured that the integrated circuit remains associated with the particular package and its contents. Problems inherent with placing such a radio frequency identification tag are avoided, such as label removal, misapplication, label tampering, or label damage, which can result in the closed package losing its unique identification and all of the retained information. An additional advantage of the present invention, wherein the integrated circuit 16 is preferably positioned on or at the inside surface of the closure 12, is the efficiency with which the integrated circuit 16, via antenna 18, can be interfaced. As will be appreciated, product labels are typically located within the fill level of a package, thus requiring that any radio frequency interface be established through the food or beverage product. The transmission of radio frequency information can be adversely affected by the medium through which it is transmitted, and in general, liquid is not as conducive to radio frequency transmission as is air. This is especially true with regard to radio frequency transmissions in the ultra-high frequency (UHF) range. There is an increasing trend to operate radio frequency identification devices in the UHF range in order to increase the range of transmissions.

As discussed hereinabove in connection with other applications of the present invention, it is contemplated that information to be "written" on integrated circuit 16 can be effected at the time of product packaging, such as by a "smart" capping machine or other auxiliary radio frequency writing device which can write information on the integrated circuit 16 at the point of closure packaging for the beverage or food product. In this manner, it is possible to provide each individual package with an exact "born on date", unique identification code, detailed product use information, or other relevant information as may be desired. It is also possible to record selected process parameters to which each individual package was subjected during the packaging process.

For some applications, it can be desirable to reduce the size, complexity, and cost of the installed integrated circuit 16. For such applications, it is envisioned that the circuitry only be capable of receiving a unique identification code written thereon which acts to identify each individual package. By this technique, the bulk of relevant product information, including data captured from a sensor array of the package, can be captured on an Internet or other data base which can be later accessed through the unique product identification code of each individual package.

As will be appreciated, by disposition of the integrated circuit 16 in the closure 12 of the present package, as opposed to placement on an exterior label, problems associated with missing, removed, or damaged labels are obviated. Because the closure on which the integrated circuit is mounted is an integral and functional component of the package structure, it becomes inseparably associated with a specific sealed package. Desirably, radio frequency retrieval of information stored on the integrated circuit can be effected without affecting the integrity of the sealed package.

Because the integrated circuit 16 is preferably positioned within the closure 12, it is also optimally positioned, relative to the package contents, for transmission of information through radio frequency coupling. Since the closure is typically at the very highest elevation of the package, issues associated with radio frequency transmission through liquids or other media, other than air, are minimized or eliminated.

Additional advantages of the present invention include elimination of "mixed labels", that is, ensuring that the correct radio frequency identification circuit is associated with the intended product. Since labeling of the product is ordinarily performed downstream of a capping operation, disposition of the integrated circuit 16 in the package closure provides the capability to capture capping process information for each individual package at the time of capping. By disposition of the radio frequency identification circuit in the closure, the need for multiple inventories of "tagged" labels is eliminated, since all relevant information is captured at the time of packaging, regardless of how the package is later labeled downstream. From a cost and efficiency viewpoint, each individual package only requires a single radio frequency identification tag; packages with multiple identification tags add no intrinsic value. Again, this underscores the desirability of providing the radio frequency integrated circuit in the package closure, as opposed to inside labeling for the package.

A further aspect of the present invention contemplates a "smart capping machine", that is, a capping machine for applying closures such as 12, with the machine being equipped with sensors to provide capping condition information, and the necessary radio frequency interface electronics to transfer this information to each individual package as it is capped. A capping machine having radio frequency identification technology in accordance with the present invention is capable of writing a "born on date" on each individual package, assign each individual package a unique item identification code, and/or write promotional information on each individual package. The present capping machine is also able to test the radio frequency integrated circuit 16 of each individual package to ensure that the device is functioning properly before the package enters the post-processing and distribution channels.

It is within the purview of the present invention that a capping machine equipped with radio frequency writing technology would only write a unique product code on each individual package, while simultaneously writing all process, promotional, and radio frequency identification testing information onto an Internet or other electronic data base. While the capping machine would function generally as described above, the bulk of information would ultimately be stored in such a data base, rather than on the integrated circuit of the package.

From the foregoing, it will be observed that numerous modifications and variations can be effected without departing from the true spirit and scope of the novel concept of the present invention. It is to be understood that no limitation with respect to the specific embodiments disclosed herein is intended or should be inferred.

What is claimed is:

1. An interactive information product package, comprising:
   a plastic closure including a top wall portion, and a depending annular skirt portion;
   a container on which said closure is secured for closing the contents of the container;
   a radio frequency integrated circuit disposed at an inside surface of said top wall portion and within said package when said closure is secured to said container; and
   at least one sensing device operatively connected to said integrated circuit and exposed to the interior of said package for sensing a condition of the contents within said package.

2. An interactive information product package in accordance with claim 1, including:
   an antenna operatively connected to said integrated circuit.

3. An interactive information product package in accordance with claim 1, wherein:
   said sensing device is selected from the group comprising a pressure sensor, a temperature sensor, a chemical sensor, and a biological sensor.

4. An interactive information product package in accordance with claim 1, including:
   a power supply operatively connected to said integrated circuit.

5. A method of conducting a product promotion, comprising the steps of:
   providing a product package comprising a plastic closure, a container to which said closure is secured for closing the contents of the container, and a radio frequency integrated circuit disposed within said package when said closure is secured to said container;
   remotely programming the integrated circuit from the exterior of the package via radio frequency transmission to write promotional information onto said integrated circuit; and retrieving the promotional information from said integrated circuit by radio frequency transmission for use of the information in conducting a product promotion.

6. A method of conducting a product promotion in accordance with claim 5, wherein:

said promotional information uniquely identifies an individual product package.

7. A method of conducting a product promotion in accordance with claim 5, including:

interfacing said promotional information with a data base at which additional promotional information is stored to thereby limit the data storage requirements of said integrated circuit.

8. A method of conducting a product promotion in accordance with claim 5, including:

reprogramming said integrated circuit after said remotely programming step.

9. A method of monitoring the contents of a package for quality assurance, comprising the steps of:

providing a product package comprising a plastic closure including a top wall portion and a depending annular skirt portion, a container to which said closure is secured for closing the contents of the container, a radio frequency integrated circuit disposed at an inside surface of said top wall portion and within said package when said closure is secured to said container, and at least one sensing device operatively connected to said integrated circuit and exposed to the interior of said package for sensing a condition of the contents of said package;

remotely programming the integrated circuit from the exterior of the package; and retrieving information from said integrated circuit regarding the condition of the contents of said package by radio frequency transmission.

10. A method of monitoring the contents of a package in accordance with claim 9, wherein:

said at least one sensing device comprises a pressure sensor for sensing the pressure of the contents of said package, said retrieving step including retrieving pressure history information from said integrated circuit.

11. A method of monitoring the contents of a package in accordance with claim 9, wherein:

said sensing device comprises a temperature sensor.

12. A method of monitoring the contents of a package in accordance with claim 9, including:

internally powering said integrated circuit by providing an internal power supply operatively connected thereto.

13. A method of providing quality assurance for the contents of a package, comprising the steps of:

providing a product package comprising a plastic closure, a container to which said closure is secured for closing the contents of the container, a radio frequency integrated circuit disposed within said package when said closure is secured to said container, and at least one sensing device operatively connected to said integrated circuit for sensing a condition of the contents of said package;

remotely programming the integrated circuit from the exterior of the package; and providing an audio device operatively connected to said integrated circuit to provide a consumer with an audio message regarding the condition of the contents of said package.

14. A method of providing quality assurance in accordance with claim 13, wherein:

said at least one sensing device comprises a pressure sensor for sensing the pressure of the contents of said package.

15. A method of disseminating information regarding the contents of a package, comprising the steps of:

providing a product package comprising a plastic closure including a top wall portion and a depending annular skirt portion, a container to which said closure is secured for closing the contents of the container, and a radio frequency integrated circuit disposed at an inside surface of said top wall portion and within said package when said closure is secured to said container;

remotely programming the integrated circuit from the exterior of the package with information regarding the contents of the package; and retrieving information from said integrated circuit by radio frequency transmission, wherein said step of remotely programming includes at least one of: (1) programming information regarding one or more conditions under which said contents of said package were packaged therein; and (2) programming information relating to the preparation and use of the contents of the package.

16. A method of disseminating information in accordance with claim 15, wherein:

said programmed information is selected from the group comprising: packaging date; packaging apparatus; torque applied to said closure; and ambient temperature during packaging.

17. A method of disseminating information in accordance with claim 15, including:

accessing additional information on the Internet by use of said information retrieved by radio frequency transmission.

18. A method of disseminating information in accordance with claim 15 including:

providing a capping apparatus for applying said closure to said container, including providing said capping apparatus with radio frequency interface electronics for effecting said remotely programming step.

19. A method of packaging a product, comprising the steps of:

providing a product package comprising a plastic closure, a container to which said closure is secured for closing the contents of the container, and a radio frequency integrated circuit disposed within said package when said closure is secured to said container;

remotely programming the integrated circuit from the exterior of the package via radio frequency transmission to write product information onto said integrated circuit; and retrieving the product information from said integrated circuit by radio frequency transmission for subsequent use of the information.

20. A method of packaging a product in accordance with claim 19, wherein:

said product information uniquely identifies an individual product package.

21. A method of packaging a product in accordance with claim 19, including:

interfacing said product information with a data base at which additional product information is stored to thereby limit the data storage requirements of said integrated circuit.

22. A method of packaging a product in accordance with claim 19, including:
reprogramming said integrated circuit after said remotely programming step.

23. A method of packaging a product in accordance with claim 21, wherein:
said additional product information includes promotional information.

24. A method of packaging a product in accordance with claim 19 including:
accessing additional product information on the Internet by use of said product information retrieved by radio frequency transmission.

25. A method of packaging a product in accordance with claim 21 including:
providing at least one sensing device operatively connected to said integrated circuit for sensing a condition of the contents of said package, said additional product information including data captured by said sensing device.

26. A method of monitoring the contents of a package for quality assurance, comprising the steps of:
providing a product package comprising a plastic closure, a container to which said closure is secured for closing the contents of the container, a radio frequency integrated circuit disposed within said package when said closure is secured to said container, and at least one sensing device operatively connected to said integrated circuit for sensing a condition of the contents of said package;
remotely programming the integrated circuit from the exterior of the package; and
retrieving information from said integrated circuit regarding the condition of the contents of said package by radio frequency transmission,
wherein said sensing device comprises a biological sensor for sensing the presence of microorganisms in said package.

27. A method of monitoring the contents of a package for quality assurance, comprising the steps of:
providing a product package comprising a plastic closure, a container to which said closure is secured for closing the contents of the container, a radio frequency integrated circuit disposed within said package when said closure is secured to said container, and at least one sensing device operatively connected to said integrated circuit for sensing a condition of the contents of said package;
remotely programming the integrated circuit from the exterior of the package; and
retrieving information from said integrated circuit regarding the condition of the contents of said package by radio frequency transmission,
wherein said sensing device comprises a chemical sensor for sensing the presence of at least one selected chemical within said package.

28. A method of monitoring the contents of a package for quality assurance, comprising the steps of:
providing a product package comprising a plastic closure, a container to which said closure is secured for closing the contents of the container, a radio frequency integrated circuit disposed within said package when said closure is secured to said container, and at least one sensing device operatively connected to said integrated circuit for sensing a condition of the contents of said package;
remotely programming the integrated circuit from the exterior of the package; and
retrieving information from said integrated circuit regarding the condition of the contents of said package by radio frequency transmission,
wherein said sensing device comprises a temperature sensor, and said method includes elevating the temperature of said package for heating the contents thereof, said retrieving step including retrieving a temperature history for the contents of said package.

29. A method of monitoring the contents of a package in accordance with claim 28 including:
retrieving said temperature history in real time to optimize a heat treatment process.

30. A method of monitoring the contents of a package for quality assurance, comprising the steps of:
providing a product package comprising a plastic closure, a container to which said closure is secured for closing the contents of the container, a radio frequency integrated circuit disposed within said package when said closure is secured to said container, and at least one sensing device operatively connected to said integrated circuit for sensing a condition of the contents of said package;
remotely programming the integrated circuit from the exterior of the package; and
retrieving information from said integrated circuit regarding the condition of the contents of said package by radio frequency transmission,
including non-destructively sorting a plurality of said packages on the basis of information retrieved from said integrated circuit of each said package.

* * * * *